No. 692,944.  
Patented Feb. 11, 1902.

J. MacM. THORNE.
FELLY AND TIRE BRACE.
(Application filed May 4, 1901.)

(No Model.)

Witnesses  
John MacM. Thorne, Inventor.  
by C. A. Snow & Co.  
Attorneys

UNITED STATES PATENT OFFICE.

JOHN MacMARION THORNE, OF WILLIAMS, ARIZONA TERRITORY.

FELLY AND TIRE BRACE.

SPECIFICATION forming part of Letters Patent No. 692,944, dated February 11, 1902.

Application filed May 4, 1901. Serial No. 58,771. (No model.)

*To all whom it may concern:*

Be it known that I, JOHN MACMARION THORNE, a citizen of the United States, residing at Williams, in the county of Coconino and Territory of Arizona, have invented a new and useful Felly and Tire Brace, of which the following is a specification.

This invention relates to felly and tire braces for vehicle-wheels.

The object of the invention is to provide a novel form of device for bracing the adjacent ends of the felly-sections in such manner as to prevent the latter from being split or chipped off and also to obviate any tendency to lateral separation thereof, the device to operate to brace the tire against edgewise displacement from the felly and to be so constructed as to be capable of convenient application to wheels such as are in ordinary use without necessitating any change in their structural arrangement.

With these and other objects in view, as will appear as the nature of the invention is better understood, the same consists in the novel construction and combination of parts of a felly and tire brace, as will be hereinafter fully described and claimed.

In the accompanying drawings, forming a part of this specification, and in which like numerals of reference indicate corresponding parts, there is illustrated one form of embodiment of the invention capable of carrying the same into practical operation, it being understood that the elements therein exhibited may be varied or changed as to shape, proportion, and exact manner of assemblage without departing from the scope of the invention.

Figure 1:
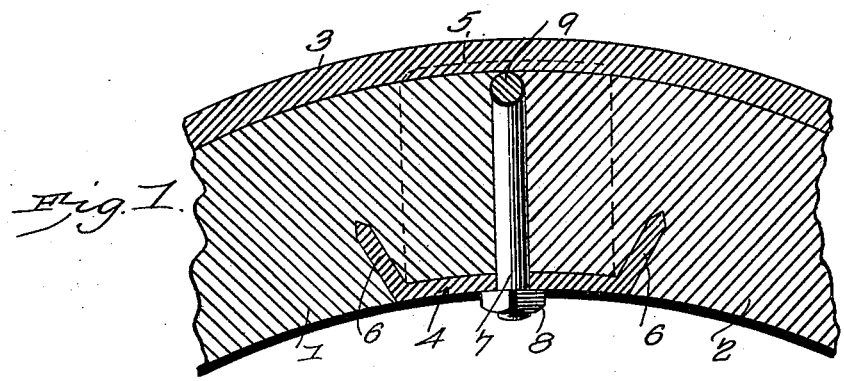
Figure 2:
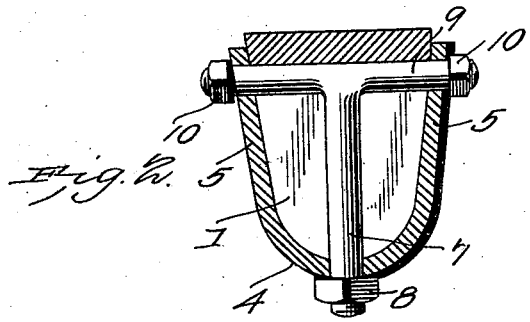
Figure 3:
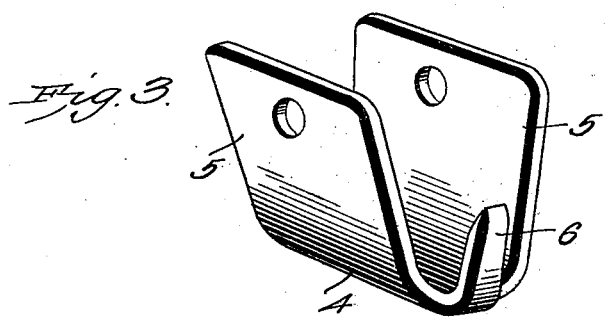

In the drawings, Figure 1 is a view in longitudinal section taken through the adjacent ends of a pair of felly-sections and exhibiting the device of the present invention applied thereto. Fig. 2 is a view in transverse section taken between the felly-sections. Fig. 3 is a detached detail view in perspective of the felly-embracing clip or stirrup.

Referring to the drawings, 1 and 2 designate the adjacent ends of opposite felly-sections, and 3 the usual tire.

The present invention consists of a felly-embracing clip or stirrup 4, substantially U-shaped, which embraces the end portions of both felly-sections from the inner side thereof, its terminal portions being projected slightly beyond the outer surface of the felly or rim to present stops or shoulders 5, that overlap the opposite edges of the tire and rest against the same, thus to prevent edgewise displacement of the tire from the rim. As clearly indicated in Fig. 2, the ends of the clip terminate short of the outer side of the tire, so that the periphery of the wheel will be free from projections. The clip is held against displacement by opposite pointed spurs or prongs 6, which are disposed at the center of the clip and upon the opposite ends thereof and are designed to be driven into the inner sides of the respective felly-sections.

To hold the clip positively associated with the felly-sections and with the tire, a fastening device is employed in the nature of a T-bolt, the shank 7 of which is seated in grooves provided in the opposed ends of the felly-sections and having its ends projected through the base of the clip and provided with a nut 8. The terminals of the head 9 of the bolt project outward beyond each side of the clip and carry nuts 10, by which the clip may be firmly secured against the tire, as will be readily understood by reference to Fig. 2. It will be understood that instead of providing the free terminals of the bolt with nuts these ends may be upset or riveted in position, and as this will be obvious detailed illustration thereof is deemed unnecessary; but generally it will be preferred to employ nuts in order to facilitate the removal of the clips should it be necessary to replace a felly-section, insert loose spokes for those that have become destroyed, or for the purpose of tightening the tire.

While not herein shown, it is to be understood that the clip may be let in flush with the rim, and as this will also be obvious illustration thereof is omitted.

Having thus fully described my invention, what I claim as new, and desire to secure by Letters Patent, is—

A vehicle-wheel having a substantially U-shaped clip embracing the felly with its opposite ends projected outwardly beyond the periphery thereof, but terminating short of the tread of the rim, to present tire-embracing stops to prevent lateral displacement of the tire, the end portions of the bend of the clip being provided with spurs or prongs to be seated in the felly, and a T-shaped bolt having its terminals provided with means for holding them rigidly associated with the clip, substantially as and for the purpose specified.

In testimony that I claim the foregoing as my own I have hereto affixed my signature in the presence of two witnesses.

JOHN MacMARION THORNE.

Witnesses:
  A. E. MACOMBER,
  M. SALZMAN.